(No Model.)

J. M. MARKHAM.
CATTLE PRICKER BELT.

No. 352,335. Patented Nov. 9, 1886.

Witnesses
Harry S. Rohrer
Charles W. Werle

Inventor
Jackson M. Markham
By his Attorney O. E. Duffy

UNITED STATES PATENT OFFICE.

JACKSON M. MARKHAM, OF WILLIAMSVILLE, MISSOURI.

CATTLE-PRICKER BELT.

SPECIFICATION forming part of Letters Patent No. 352,335, dated November 9, 1886.

Application filed September 18, 1886. Serial No. 213,878. (No model.)

*To all whom it may concern:*

Be it known that I, JACKSON M. MARKHAM, of Williamsville, in the county of Wayne and State of Missouri, have invented certain new and useful Improvements in Cattle-Pricker Belts; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to cattle-pricker belts, and has for its object to provide a device which will be efficacious in curing cattle of such undesirable and vicious habits as lying down and staying away from home at night, jumping upon one another and over fences, rolling while in harness, or other bad habits exhibited by domestic animals, in which my invention could be of service.

To this end it consists of a belt to encircle the animal's body immediately behind the fore shoulders, said belt being provided with elastic fingers carrying spurs having spring-actuated shields secured thereto.

It consists, further, in certain details of construction and arrangement of parts, which are fully described, and specifically pointed out in the claims.

Figure 1:
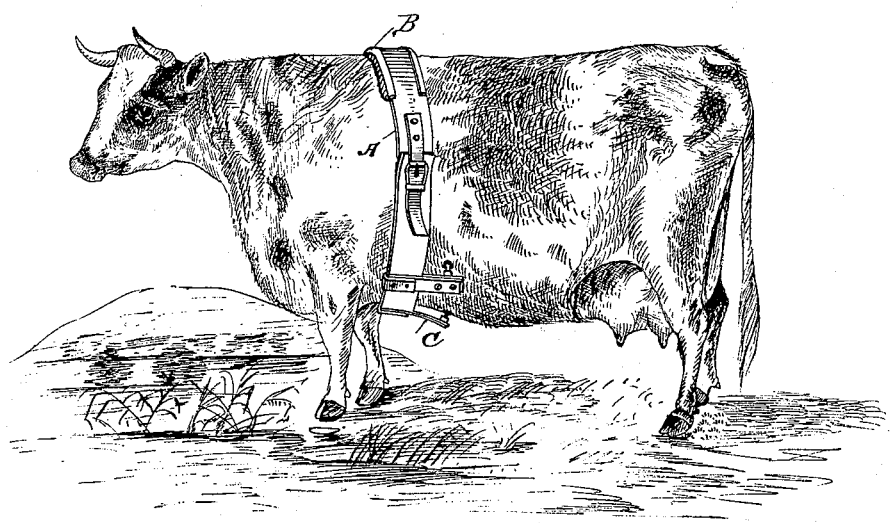
Figure 3:
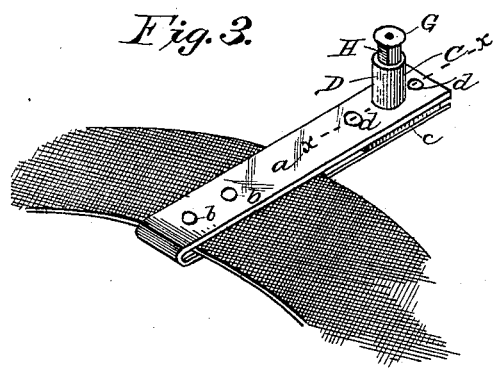
Figure 2:
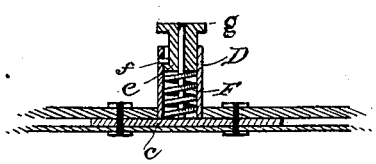
Figure 4:
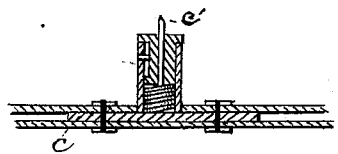

Referring to the drawings forming part of the specification, Figure 1 is a perspective view of an animal with my device secured in place thereon. Fig. 2 is a vertical longitudinal section on the line $x$ $x$, Fig. 3. Fig. 3 is a perspective view of one of the fingers shown riveted to the belt; and Fig. 4 is a similar view to that shown in Fig. 2, with the shield depressed.

Similar letters refer to similar parts throughout the several views.

A is the belt, made of any convenient material, of the desired width, having a strap on one end and buckle on the other, to fasten the same about the body of the animal, and is provided with a suitable saddle or pad, B, which fits over the withers and prevents the belt from slipping around the body, thus insuring the position of the belt and the spur-fingers C. The spur-fingers C are shown three in number; but one or more may be used, as occasion demands. These fingers are made of a bar or plate, $a$, of any elastic or spring material, preferably steel or brass, which is provided with holes $b$ and $d$, and in one end with a hole for the thimble D. It is bent midway of its length to form the slot in which the belt is placed, and to which it is secured by screws or rivets, as desired, passing through the holes $b$. Between the ends of the fingers is secured the plate $c$, carrying the thimble or socket D and spur $c'$ by rivets passing through the plate and holes $d$. The plate $c$ and thimble D may be cast in one piece, the plate having a central perforation, (not shown,) in which is fastened the lower end of the spur $c'$; or they may be made separate and secured together in any well-known manner. The thimble D serves as a seat for the spiral spring F, which surrounds the spur and actuates the shield G. This shield fits loosely within the thimble, and is provided with a circumferential flange, $g$, at its outer end, and is cut away, as at H, on one side to form the shoulder $e$. A pin, $f$, projects through the side of the thimble and abuts against the cut-away part H of the shield, which prevents the spring from pressing the shield out of the socket by engaging the shoulder $e$, and said shield is prevented from being depressed too far by the flange $g$ engaging the top of the thimble. By this construction the fingers C can be adjusted to any part of the belt desired, and by making the strap of sufficient length the belt may be made to fit any animal.

The operation of my device is as follows: The fingers being adjusted on the belt and the belt secured about the animal, as shown in Fig. 1, with the fingers extending rearward and the shields G pressing gently against the sides and belly, should the animal attempt to lie down, jump, or elevate its fore shoulders, the muscular action would cause the chest and belly to expand, which would depress the shields and cause the spurs to prick the flesh.

It will be obvious that if the action should be sudden the pricking sensation would be correspondingly quick and violent, and vice versa.

In further explanation of the uses of my invention, it is well known that cattle, especially cows, contract the habit of lying down in the day and consume that portion of their food in their first stomach, which is a quite injurious and ill-timed habit, since nature designed that the contents of their first stomach should be consumed at night, while at perfect rest. In a case of this kind my device can be applied with the satisfactory result of preventing this habit and accustoming the animal to stand in the day, and return to its quarters at night for the removal of the belt. Again, it is often the case that fresh cows neglect their calves by leaving them at home and wandering off, depriving their young of the necessary food. In an emergency of this sort the application of my device breaks the animal of this habit immediately, as she will readily return to have the device removed, thereby escaping the unpleasant feeling of its spurs. It can also be used to great advantage in curing stock of injurious habits, such as jumping upon one another, which often permanently strains the shoulders or loins, thereby decreasing the value of the animal.

In large herds of cattle one of the most sensible animals is selected as the bell-cow, and taught by this device to return home regularly. Thus by attaching this simple device to the bell-cow the whole herd is easily governed, saving time and labor to the herders, besides the consideration of the value of the manure deposited in the corral.

In cases of unmanageable horses or those that are in the habit of rolling in harness, my device is of great assistance.

As a rule, the animal need only wear the belt about ten days, as its habits of coming home will be fixed in that time, when the belt may be dispensed with for that particular animal.

Having thus fully described my invention, what I claim, and desire to secure by Letters Patent of the United States, is—

1. The device described, consisting of a belt having elastic fingers carrying spurs, the spurs being provided with the spring-actuated shields, all constructed and arranged substantially as and for the purpose set forth.

2. The device described, consisting of a belt provided with a pad, the fingers secured to the belt, spurs secured to the fingers, thimbles surrounding the spurs, and spring-actuated shields within the thimbles, substantially as and for the purpose set forth.

3. In a device for the purpose stated, the combination, with a belt and a strap and buckle to secure the belt in place, of the fingers C, provided with spurs, substantially as described, for the purpose set forth.

4. In a device for the purpose stated, the combination, with the belt provided with a strap, buckle, and saddle, of the fingers attached to the belt and provided with spurs, substantially as described, for the purpose set forth.

5. In a device for the purpose stated, the combination, with the belt provided with the saddle, strap, and buckle, of the fingers adjustable on said belt by means of screws, said fingers being provided with spurs, substantially as described, for the purpose set forth.

6. In a device for the purpose set forth, the combination, with the belt having the saddle, strap, and buckle, of the fingers, the plate $c$, thimble D, spur $c'$, spring F, surrounding said spur, and the guard G, substantially as described.

7. In a device for the purpose set forth, the combination, with the belt provided with a saddle, strap, and buckle, of the fingers provided with the plate, thimble, and spur, the guard G, having a flange, $g$, shoulder $e$, and cut-away part H, and the pin $f$, substantially as described.

8. The spur-finger consisting of a bar or plate of elastic or spring material, provided with perforations and bent midway of its length to form a slot, and having the plate $c$, thimble D, and spur $c'$ seated in its unbent ends, the spring F, surrounding said spur, the guard G, provided with the flange $g$, shoulder $e$, and cut-away portion H, and the pin $f$, passing through the thimble D, and abutting against the cut-away portion to limit the movement of the guard, substantially as described.

In testimony that I claim the foregoing as my own I affix my signature in presence of two witnesses.

JACKSON M. MARKHAM.

Witnesses:
O. E. DUFFY,
C. M. WERLE.